(12) United States Patent  
Sugiyama et al.

(10) Patent No.: US 11,531,466 B2  
(45) Date of Patent: Dec. 20, 2022

(54) TOUCHSCREEN OPERATION SWITCH, EQUIPMENT MANAGEMENT DEVICE, AND EQUIPMENT-MANAGEMENT-SCREEN GENERATION METHOD

(71) Applicant: TOSHIBA CARRIER CORPORATION, Kawasaki (JP)

(72) Inventors: Naoya Sugiyama, Shizuoka (JP); Koichiro Sakurai, Shizuoka (JP); Hidemitsu Kawai, Shizuoka (JP)

(73) Assignee: TOSHIBA CARRIER CORPORATION, Kanagawa (JP)

( * ) Notice: Subject to any disclaimer, the term of this patent is extended or adjusted under 35 U.S.C. 154(b) by 0 days.

(21) Appl. No.: 17/649,753

(22) Filed: Feb. 2, 2022

(65) Prior Publication Data

US 2022/0155954 A1    May 19, 2022

Related U.S. Application Data

(63) Continuation of application No. 16/966,510, filed as application No. PCT/JP2018/011123 on Mar. 20, 2018.

(30) Foreign Application Priority Data

Jan. 31, 2018    (JP) ................. 2018-014516

(51) Int. Cl.
*G06F 3/048*     (2013.01)
*G06F 3/04886*   (2022.01)
(Continued)

(52) U.S. Cl.
CPC .......... *G06F 3/04886* (2013.01); *F24F 11/52* (2018.01); *G05B 19/042* (2013.01);
(Continued)

(58) Field of Classification Search
None
See application file for complete search history.

(56) References Cited

U.S. PATENT DOCUMENTS

2014/0139450 A1   5/2014  Levesque et al.
2014/0165000 A1*  6/2014  Fleizach ............... G06F 3/0488
                                                       715/810
(Continued)

FOREIGN PATENT DOCUMENTS

CN    106656689    5/2017
EP    2733576     5/2014
(Continued)

OTHER PUBLICATIONS

Extended European Search Report issued in EP 21198985.0, dated Jan. 5, 2022.

(Continued)

*Primary Examiner* — Tuan S Nguyen
(74) *Attorney, Agent, or Firm* — DLA Piper LLP US

(57) ABSTRACT

An equipment-management device associated with at least one of multiple pieces of equipment in a building under management, the equipment-management device including a display-information generator, a touchscreen, and an action-control-information generator. The display-information generator generates display information on a management screen wherein icons are arranged, each of the icons including an outer frame and a first area set at one end along the major axis within the outer frame. The touchscreen displays the display information and receives an input of information relating to an operation performed on the management screen. Upon detecting that a slide operation performed on one of the icons of the management screen from the first area through a first slide-operation detecting line set inside the outer frame excluding the first area, the action-control-information generator generates action-control
(Continued)

information that switches the power supply of the corresponding equipment on or off.

9 Claims, 8 Drawing Sheets

(51) Int. Cl.
*F24F 11/52* (2018.01)
*G05B 19/042* (2006.01)
*G06F 3/04817* (2022.01)
*G06F 3/0482* (2013.01)
*G06F 3/04847* (2022.01)

(52) U.S. Cl.
CPC ........ *G06F 3/0482* (2013.01); *G06F 3/04817* (2013.01); *G06F 3/04847* (2013.01); *G05B 2219/2614* (2013.01)

(56) References Cited

U.S. PATENT DOCUMENTS

| | | | | |
|---|---|---|---|---|
| 2015/0033136 A1* | 1/2015 | Sasaki | ...................... | H04L 41/22 715/736 |
| 2016/0070455 A1* | 3/2016 | Dawson | .............. | G06F 3/04883 715/773 |
| 2016/0216765 A1 | 7/2016 | Levesque et al. | | |
| 2017/0223263 A1* | 8/2017 | Kasa | ................... | H04N 5/23245 |
| 2017/0340293 A1* | 11/2017 | Al-Ali | ..................... | A61B 5/743 |
| 2020/0014844 A1 | 1/2020 | Kasa et al. | | |
| 2020/0021456 A1 | 1/2020 | Wu | | |

FOREIGN PATENT DOCUMENTS

| | | |
|---|---|---|
| EP | 3182692 | 6/2017 |
| JP | 2001-309455 | 11/2001 |
| JP | 2002-300680 | 10/2002 |
| JP | 2017-224195 | 12/2017 |
| WO | WO 2016/024440 | 2/2016 |

OTHER PUBLICATIONS

European Search Report issued in EP 18904194.0, dated Feb. 26, 2021.
International Search Report issued in PCT/JP2018/011123,dated May 1, 2018.
Written Opinion issued in PCT/JP2018/011123, dated May 1, 2018.
U.S. Appl. No. 16/966,510, US 2021-0048946 A1, filed Jul. 31, 2020, Pending.
U.S. Appl. No. 16/966,510 electronically captured from on Nov. 1, 2022 (Sep. 2, 2022 to Present).

* cited by examiner

TOUCHSCREEN OPERATION SWITCH, EQUIPMENT MANAGEMENT DEVICE, AND EQUIPMENT-MANAGEMENT-SCREEN GENERATION METHOD

CROSS REFERENCE TO RELATED APPLICATIONS

This application is a continuation application of U.S. patent application Ser. No. 16/966,510, filed Jul. 31, 2020, which claims the benefit of priority from International Application No. PCT/JP2018/011123 filed Mar. 20, 2018, which claims priority from Japanese Patent Application No. 2018-014516 filed Jan. 31, 2018. The entirety of all the above-listed applications are incorporated herein by reference.

TECHNICAL FIELD

An embodiment of the present invention relates to a touchscreen operation switch, an equipment management device, and an equipment-management-screen generation method.

BACKGROUND ART

Large buildings such as commercial facilities and office buildings usually have a large number of pieces of equipment, which are centrally managed by a central management device. The central management device obtains operational state information sequentially from each piece of equipment and holds the operational state information.

The central management device is capable of communicating with equipment management devices which are operation terminals for administrators of the equipment to perform equipment management, and the administrator uses the operation terminal to change the operational state of the equipment. To change the operational state of the equipment, the administrator first accesses the central management device through the operation terminal to have an equipment management screen for managing the equipment in the building displayed on the display of the operation terminal. This equipment management screen shows arranged icons representing the pieces of equipment under management. The administrator can check the operational state of each piece of equipment on this equipment management screen and can also select an icon representing a desired piece of equipment and operate the icon to change the operational state, for example, operation/stop of the piece of equipment.

CITATION LIST

Patent Literature

Patent Literature 1: Japanese Patent Application Publication No. 2010-199900

SUMMARY OF INVENTION

For the operation terminals for performing foregoing equipment management, tablet terminals equipped with a capacitive touchscreen or the like have been widely used in recent years. Tablet terminals equipped with a touchscreen allow the administrator to change the operational state of a desired piece of equipment easily by simply performing touch operations on an icon representing the piece of equipment on a displayed equipment management screen.

However, although a capacitive touchscreen makes it easy to designate and operate a piece of equipment, there is a possibility that even when the screen is touched without an intention of operation, the icon is selected and an erroneous operation occurs. To prevent such erroneous operations, changing the operational state of a piece of equipment requires two or more actions, instead of one action, to determine the operation, so that an operation intended by the administrator can be correctly applied to the operation of the equipment.

For example, when an operation is performed on an icon representing a piece of equipment, a screen is newly displayed for an operation to change the operational state. Then, when a specified operation has been performed on this screen, the corresponding process is executed. Alternatively, when an operation is performed on an icon representing a piece of equipment (for example, an icon representing a specified air conditioner), a screen is newly displayed for checking the intention of the administrator, such as "Are you sure that you want to start (or stop) the operation of the air conditioner?". If an operation to show the agreement to start or stop the air conditioning operation has been performed on this screen, the corresponding process is executed.

Such two-step operation for changing the operational state prevents erroneous operations in the case where the administrator inadvertently touches the equipment management screen, but on the other hand, there is a problem that this makes the operation complicated for the administrator.

The invention has been made in light of the above situation, and an object of the invention is to provide a touchscreen operation switch, an equipment management device, and an equipment-management-screen generation method in which operations intended by the administrator can be performed easily on icons displayed on the touchscreen.

To achieve the above object, an equipment management device according to an embodiment is associated with at least one of multiple pieces of equipment in a building under management and includes a display-information generator, a touchscreen, and an action-control-information generator. The display-information generator is configured to generate display information on a management screen in which a plurality of icons are arranged, each of the plurality of icons having a laterally elongated outer frame and a first area that is set inside the outer frame at one end in a major axis direction of the outer frame. The touchscreen is configured to display the generated display information on the management screen and configured to input information on an operation performed on the management screen through the touchscreen. The action-control-information generator configured to generate action control information that switches the on/off state of a corresponding piece of equipment when the action-control-information generator detects a slide operation, the slide operation performed on one of the plurality of icons on the management screen displayed on the touchscreen such that the slide operation starts in the first area and passes a first slide-operation detection line set in an area substantially inside the outer frame excluding the first area.

DESCRIPTION OF EMBODIMENTS

<Configuration of Air Conditioning System using Equipment Management Device according to Embodiment>

Figure 1:
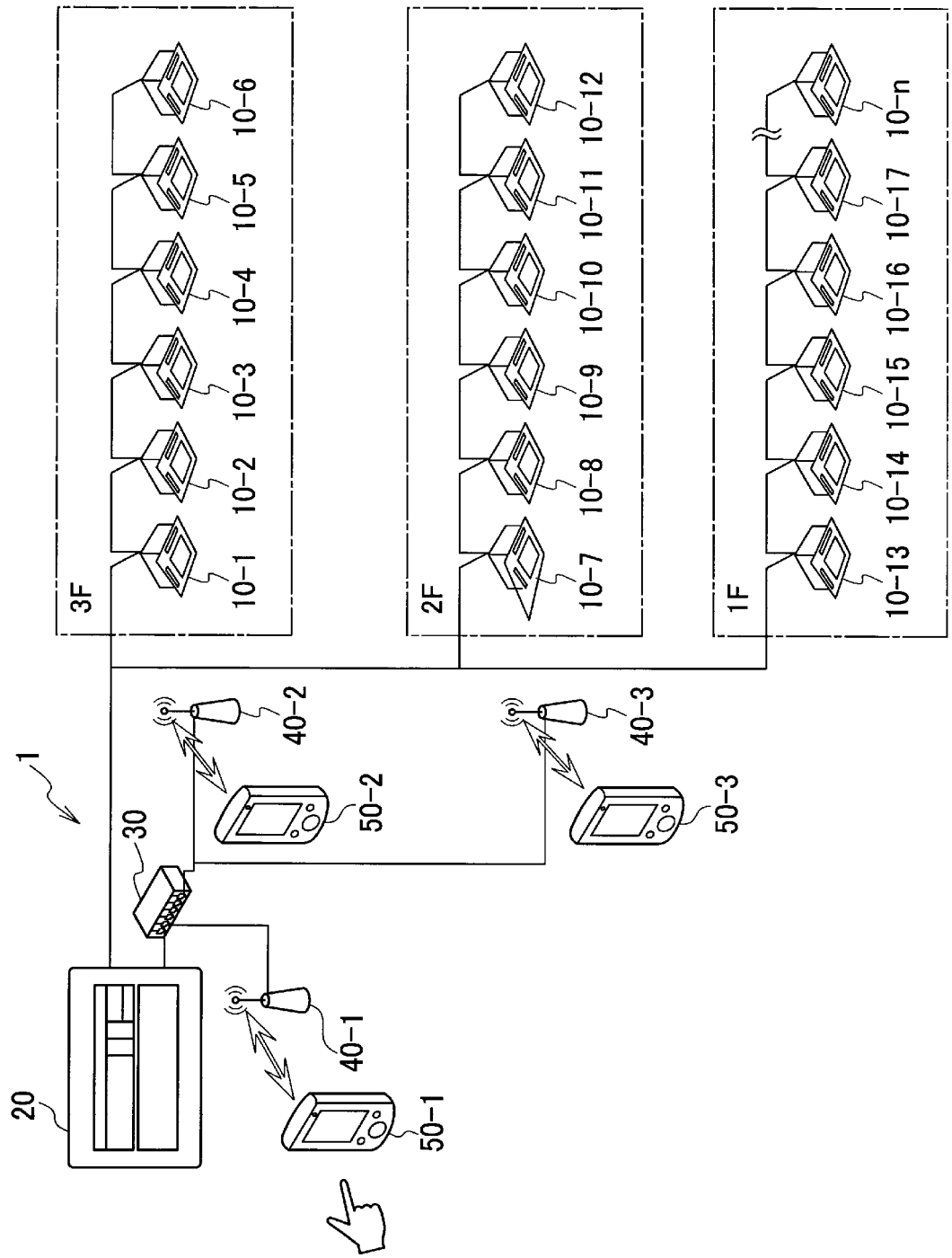
FIG. 1 is an overall view of an air conditioning system using tablet terminals serving as equipment management devices according to an embodiment of the present invention.

The configuration of an air conditioning system using tablet terminals, which are portable terminals equipped with a touchscreen, will be described as an embodiment of the present invention with reference to FIG. 1. An air conditioning system 1 according to the present embodiment includes multiple air conditioners (indoor units) 10-1 to 10-n installed inside a three-story building, a controller 20 serving as a central management device connected to these air conditioners 10-1 to 10-n, wireless communication access points 40-1 to 40-3 connected to the controller 20 via a hub 30, a tablet terminal 50-1 wirelessly connected to the access point 40-1, a tablet terminal 50-2 wirelessly connected to the access point 40-2, and a tablet terminal 50-3 wirelessly connected to the access point 40-3. The tablet terminals 50-1 to 50-3 are operated by administrators of the air conditioning system 1. Note that the number of tablet terminals used in the air conditioning system 1 may be one.

Of the air conditioners 10-1 to 10-n, the air conditioners 10-1 to 10-6 are located in a shop A on the first floor of the building, the air conditioners 10-7 to 10-12 are located in a shop B on the second floor, and the air conditioners 10-13 to 10-n are located in a shop C on the third floor.

In this air conditioning system 1, the multiple air conditioners 10-1 to 10-n located inside the building correspond to pieces of equipment, and the tablet terminals 50-1 to 50-3 correspond equipment management devices.

In the following, in the case where one of the air conditioners 10-1 to 10-n referred to does not have to be a specific one, it will be referred to as an "air conditioner 10". In the same manner, in the case where one of the tablet terminals 50-1 to 50-3 referred to does not have to be a specific one, it will be referred to as a "tablet terminal 50". Also, in the same manner, in the case where one of the access points 40-1 to 40-3 referred to does not have to be a specific one, it will be referred to as an "access point 40".

The controller 20 communicates with the air conditioners 10-1 to 10-n to send action control information for controlling the operation of the air conditioners 10-1 to 10-n as necessary and to receive operational state information on the air conditioners 10-1 to 10-n at specified time intervals.

Figure 2:
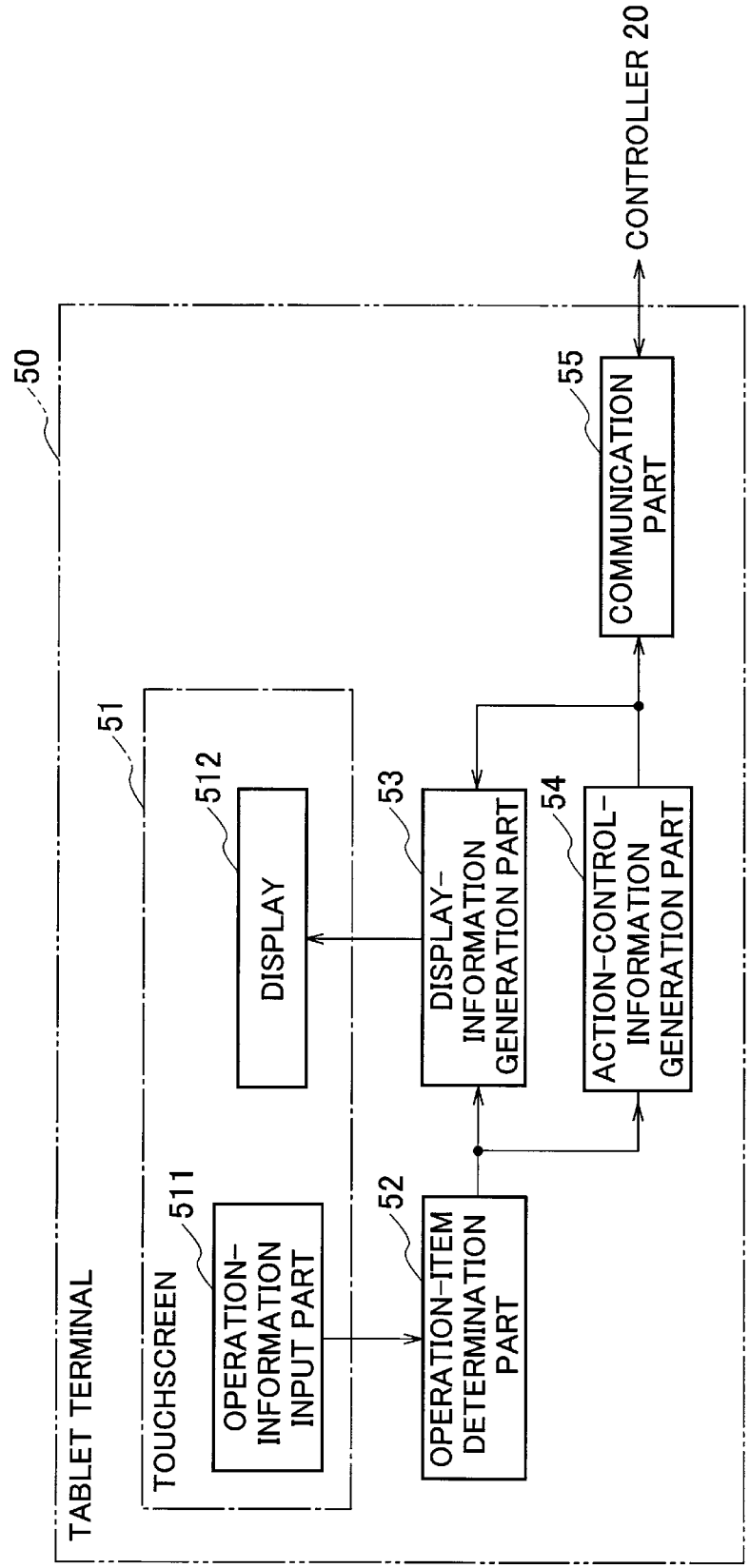
FIG. 2 is a block diagram illustrating the configuration a tablet terminal serving as an equipment management device according to the embodiment of the present invention.

Each tablet terminal 50 includes, as illustrated in FIG. 2, a touchscreen 51, an operation-item determination part 52, a display-information generator 53, an action-control-information generator 54, and a communication part 55.

The touchscreen 51 includes an operation-information input part 511 and a display 512. The operation-information input part 511 detects operation of an administrator such as touches of the administrator's finger on the touchscreen 51 and inputs corresponding operation information. The display 512 displays management screens for the air conditioners 10-1 to 10-n generated by the display-information generator 53 described later.

The operation-item determination part 52 determines the operation item that the administrator performed, based on operation information inputted from the operation-information input part 511. Examples of operation items include an operation for starting management work, operations for changing the operating condition of a specific air conditioner, and an operation for ending the management work. Examples of operations for changing the operating condition of a specific air conditioner include an operation for starting the air conditioning operation (turning on) and an operation for stopping the air conditioning operation (turning off). The display-information generator 53 generates display information to be displayed on the display 512 based on the operation item determined by the operation-item determination part 52. The action-control-information generator 54 generates action control information for the air conditioners 10-1 to 10-n, for example, operation-start-instruction information or operation-stop-instruction information, based on the operation item determined by the operation-item determination part 52. The communication part 55 communicates with the controller 20 via an access point 40.

<Operation of Air Conditioning System using Equipment Management Device according to Embodiment>

Next, the operation of the air conditioning system 1 according to the present embodiment will be described. In the air conditioning system 1, the controller 20 obtains operational state information on the air conditioners 10-1 to 10-n at specified time intervals and holds it.

Figure 3:
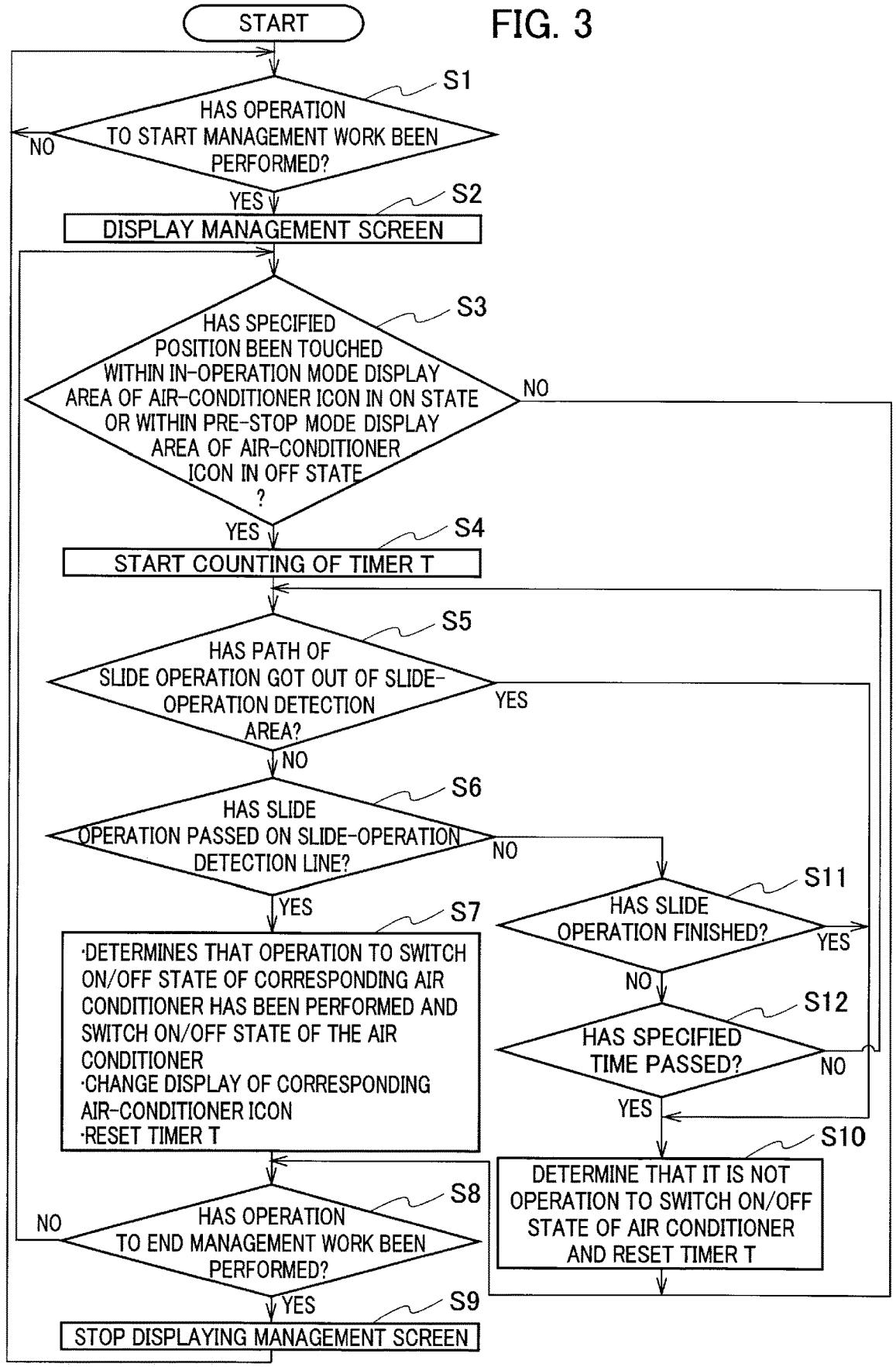
FIG. 3 is a flowchart illustrating the operation of the tablet terminal serving as the equipment management device according to the embodiment of the present invention.

The operation for the case where an administrator uses a tablet terminal 50 to do management work for the air conditioners 10-1 to 10-n is described with reference to FIG. 3. FIG. 3 is a flowchart illustrating the process executed by the tablet terminal 50 when an administrator operates a tablet terminal 50 to do management work for the air conditioners 10-1 to 10-n.

First, when the administrator operates the touchscreen 51 of the tablet terminal 50 to start the management work for the air conditioners 10-1 to 10-n, this operation information is inputted through the operation-information input part 511. The inputted operation information is obtained by the operation-item determination part 52, and based on this operation information, the operation item is determined. In this case, it is determined that the operation for starting management work has been performed by the administrator ("YES" at S1), and the display-information generator 53 generates display information on a management screen with the latest operational state information on the air conditioners 10-1 to 10-n. The generated display information is sent to the display 512 of the touchscreen 51, and the corresponding management screen is displayed (S2). Note that in the case where the tablet terminal 50 is a terminal dedicated to the equipment management, the management screen may be displayed by default without the operation for starting the management work.

Figure 4:
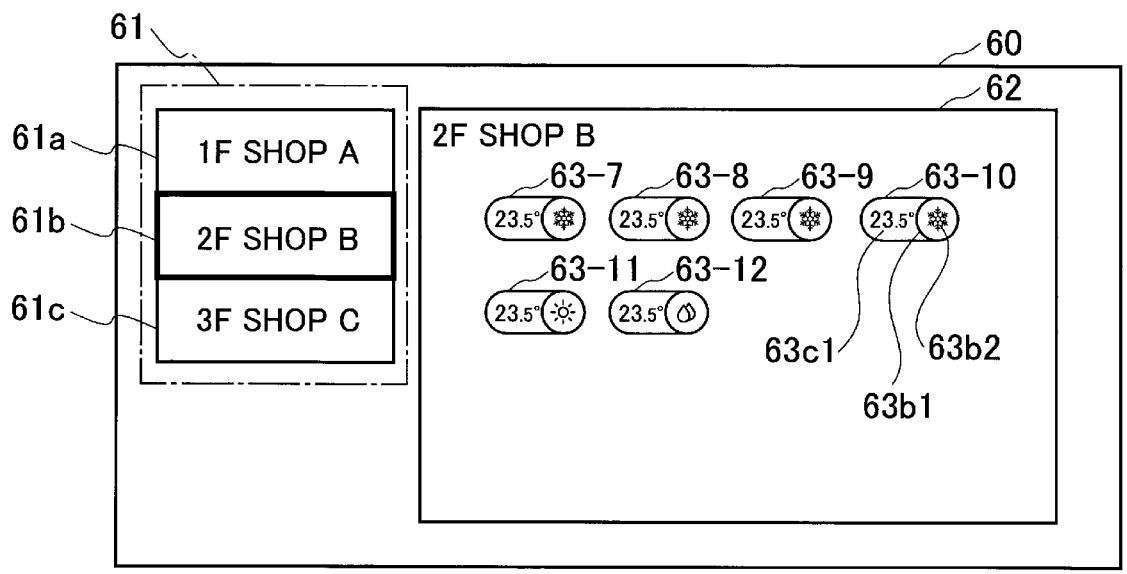
FIG. 4 is an example of a management screen displayed on a tablet terminal serving as an equipment management device according to the embodiment of the present invention.

An example of the management screen displayed on the display 512 is illustrated in FIG. 4. The management screen 60 in FIG. 4 has an area-designation-button display section 61 and an air-conditioner-icon display section 62. The area-designation-button display section 61 is displaying an operation button 61a for designating "the shop A on the first floor" as the management-work target area, an operation button 61b for designating "the shop B on the second floor", and an operation button 61c for designating "the shop C on the third floor". The number of operation buttons and the display information on the buttons displayed in the area-designation-button display section 61 are changed depending on the number of management target areas and what each area is.

FIG. 4 shows a state where "the shop B on the second floor" is designated by tapping the operation button 61b in the area-designation-button display section 61 on the screen. The air-conditioner-icon display section 62 is displaying air-conditioner icons 63-7 to 63-12 in order, respectively associated with the multiple air conditioners 10-7 to 10-12 in "the shop B on the second floor" designated in the area-designation button display section 61. These air-conditioner icons 63-7 to 63-12 function as operation switches for controlling the operation of the respective air conditioners 10-7 to 10-12.

The present embodiment illustrates a case where one air-conditioner icon is associated with one air conditioner but is not limited to this case. One air-conditioner icon may be associated with multiple air conditioners. In the case where one air-conditioner icon is associated with multiple air conditioners, the operation of this air-conditioner icon controls the associated multiple air conditioners collectively.

In the following, in the case where one of the air-conditioner icons 63-7 to 63-12 referred to does not have to be a specific one, it will be referred to an "air-conditioner icon 63". A detailed configuration of the air-conditioner icon 63 will be described with reference to FIG. 5. Each air-conditioner icon 63 has a laterally elongated oval outer frame 63a, an in-operation mode display area 63b corresponding to a first area, a set-temperature-information display area 63c corresponding to a second area, and a pre-stop mode display area 63d corresponding to a third area. The in-operation mode display area 63b is a part inside the outer frame 63a and set at the right end, which is one end in the major axis direction. The set-temperature-information display area 63c is a part inside the outer frame 63a and set in an area other than the in-operation mode display area 63b. The pre-stop mode display area 63d is a part inside the outer frame 63a and set at the other end in the major axis direction, in other words, at the left end which is opposite to the in-operation mode display area 63b. The in-operation mode display area 63b and the pre-stop mode display area 63d are circular.

When the power of the air conditioner 10 associated with this air-conditioner icon 63 is on, a circular outer frame 63b1 is displayed at approximately the same position as the outer edge of the in-operation mode display area 63b, and an operation mode graphic 63b2 indicating the operation mode of the air conditioner 10 is displayed inside the outer frame 63b1. In FIG. 4, a graphic 63b2 indicating that cooling is in operation is displayed in the air-conditioner icons 63-7 to 63-10, a graphic 63b2 indicating that heating is in operation is displayed in the air-conditioner icon 63-11, and a graphic 63b2 indicating that dehumidification is in operation is displayed in the air-conditioner icon 63-12. The outer edge of the in-operation mode display area 63b does not have to agree perfectly with the outer frame 63b1, but the outer frame 63b1 may be drawn a little inside the outer edge of the in-operation mode display area 63b.

The set-temperature-information display area 63c, when the corresponding air conditioner 10 is in operation (in the on state), displays information 63c1 indicating the temperature set for the air conditioner 10. The pre-stop mode display area 63d, when the corresponding air conditioner 10 is stopped (in the off state), displays a circular outer frame 63d1 at approximately the same position as the outer edge of the pre-stop mode display area 63d and also displays an operation mode graphic 63d2 inside the outer frame 63d1 indicating the operation mode of the air conditioner 10 immediately before being stopped. In the same manner as for the in-operation mode display area 63b, the outer edge of the pre-stop mode display area 63d does not have to agree perfectly with the outer frame 63d1, but the outer frame 63d1 may be drawn a little inside the outer edge of the pre-stop mode display area 63d.

When the air conditioner 10 is on, the pre-stop mode display area 63d shows no indication, but the entire air-conditioner icon 63 including the outer frame 63a, display information in the in-operation mode display area 63b, and display information in the set-temperature-information display area 63c is displayed as a color image. When the air conditioner 10 is off, the in-operation mode display area 63b and the set-temperature-information display area 63c show no indication, but, as with the air-conditioner icon 63-10 in FIG. 12, the entire air-conditioner icon 63 including the outer frame 63a and display information in the pre-stop mode display area 63d is displayed as a monochrome (black and white) image.

Although the position of the pre-stop mode display area 63d is overlapped with the set-temperature-information display area 63c as described above, the display information pieces of these areas will not be overlapped because the set-temperature-information display area 63c is used only when the air conditioner 10 is on, and the pre-stop mode display area 63d is used only when the air conditioner 10 is off.

The air conditioners 10-7 to 10-12 are currently on, and accordingly the management screen 60 illustrated in FIG. 4 is displaying all the air-conditioner icons 63-7 to 63-12 as color images in the air-conditioner-icon display section 62. The air conditioners 10-7 to 10-10 are operating in a cooling mode, and accordingly the in-operation mode display area 63b inside each of the air-conditioner icons 63-7 to 63-10 shows the graphic 63b2 indicating the cooling mode. The air conditioner 10-11 is operating in a heating mode, and accordingly the in-operation mode display area 63b inside the air-conditioner icon 63-11 shows the graphic 63b2 indicating the heating mode. The air conditioner 10-12 is operating in a humidification mode, and accordingly the in-operation mode display area 63b inside the air-conditioner icon 63-12 shows the graphic 63b2 indicating the humidification mode. The temperature currently set for the air conditioners 10-7 to 10-12 is 23.5° C., and accordingly, the set-temperature-information display area 63c inside each of the air-conditioner icons 63-7 to 63-12 shows information 63c1 indicating that the set temperature is "23.5°".

The operation for the case where an administrator uses this management screen to change the power of the air conditioner 10-10 from the on state to the off state.

In the case where the air conditioner 10-10 which is the operation target is on, when an administrator touches a specified position inside the in-operation mode display area 63b on the air-conditioner icon 63-10 associated with this air conditioner 10-10 ("YES" at S3), information indicating that this position has been touched is inputted through the operation-information input part 511 and obtained by the operation-item determination part 52.

When the operation-item determination part 52 obtains the information indicating that a specified position inside the in-operation mode display area 63b has been touched, a timer T inside the operation-item determination part 52 starts time counting (S4). The timer T counts the time for which the screen is being touched.

After that, when the administrator performs a slide operation from the specified position inside the in-operation mode display area 63b where the administrator is touching to the left which is the direction toward the pre-stop mode display area 63d, this operation information is inputted through the operation-information input part 511. Based on the inputted operation information, the operation-item determination part 52 determines whether the path of the slide operation passes on a specified slide-operation detection line 63e (S6) within a specified slide-operation detection area inside the outer frame 63a ("NO" at S5).

The slide-operation detection area used in the process at step S5 and the slide-operation detection line used in the process at S6 are set by the operation-item determination part 52. In the following, examples (1) to (4) of the operation-item determination part 52 setting a slide-operation detection area and a slide-operation detection line will be described.

Figure 5:
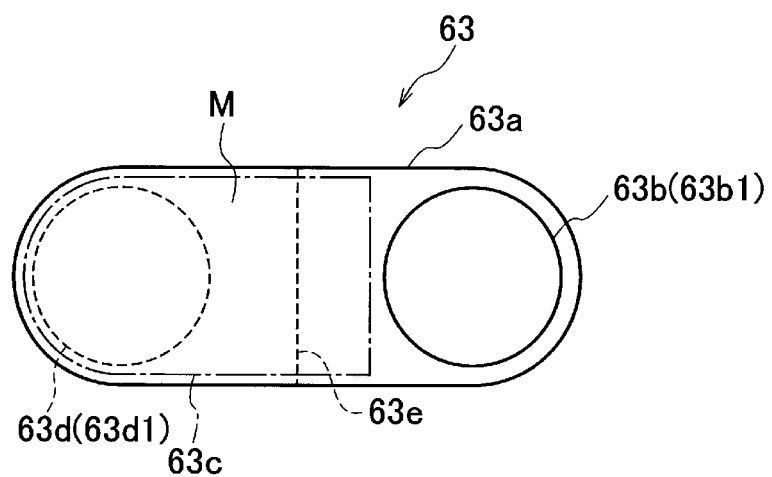
FIG. 5 is an explanatory diagram illustrating a slide-operation detection line set according to setting example (1) on an icon on the management screen displayed on a tablet terminal serving as an equipment management device according to the embodiment of the present invention.

Example (1) of Setting Slide-Operation Detection Area and Slide-Operation Detection Line Example (1) of setting a slide-operation detection area and a slide-operation detection line will be described with reference to FIGS. 5 and 6. In the example of FIG. 5, all the area of the outer frame 63a of the corresponding air-conditioner icon 63 is set as a slide-operation detection area M. As the slide-operation detection line 63e, a line oriented in the minor axis direction is set in the area inside the outer frame 63a of the air-conditioner icon 63, excluding the in-operation mode display area 63b and the pre-stop mode display area 63d, in other words, in the area between the in-operation mode display area 63b and the pre-stop mode display area 63d. This slide-operation detection line 63e is used in common to detect a slide operation from the in-operation mode display area 63b and to detect a slide operation from the pre-stop mode display area 63d.

Figure 6:
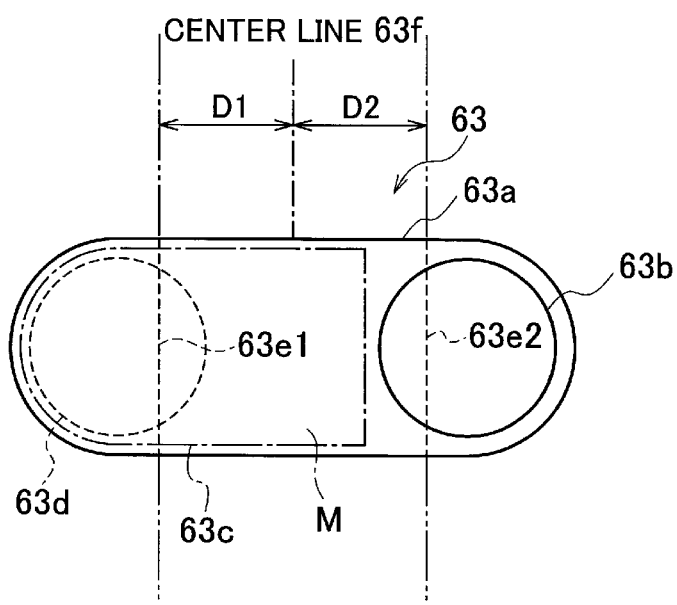
FIG. 6 is an explanatory diagram illustrating slide-operation detection lines shifted on an icon on the management screen displayed on a tablet terminal serving as an equipment management device according to the embodiment of the present invention.

In the example of FIG. 6, all the area inside the outer frame 63a of the air-conditioner icon 63 is set as the slide-operation detection area M, as in the example of FIG. 5. However, in this case, a slide-operation detection line for detecting the slide operation from the in-operation mode display area 63b and a slide-operation detection line for detecting the slide operation from the pre-stop mode display area are set at different positions.

Specifically, a first slide-operation detection line 63e1 for detecting the slide operation from the in-operation mode display area 63b is set at the position shifted by specified distance D1 in the left direction from the center line 63f that divides the air-conditioner icon 63 into two equal parts in the right-left direction. A second slide-operation operation detection line 63e2 for detecting the slide operation from the pre-stop mode display area 63d is set at the position shifted by specified distance D2 in the right direction from the center line 63f. In FIG. 6, the center line 63f and the dashed double-dotted lines extending outside the outer frame 63a from the first and second slide-operation detection lines 63e1 and 63e2 are drawn only for explanation and are not used for the detection process of slide operations.

Since the slide-operation detection line 63e1 for detecting the slide operation in the left direction is shifted to the left, and the second slide-operation detection line 63e2 for detecting the slide operation in the right direction is shifted to the right, as described above, the detection range for slide operations are further limited, so that it is possible to reduce erroneous determinations caused by inadvertent operations. Distance D1 from the center line 63f to the slide-operation detection line 63e1 and distance D2 from the center line 63f to the slide-operation detection line 63e2 may be the same or different. For operations for which erroneous determination needs to be avoided with high accuracy, the detection range of the slide operation can be further limited by increasing the distance of the shift from the center line 63f.

Figure 7:
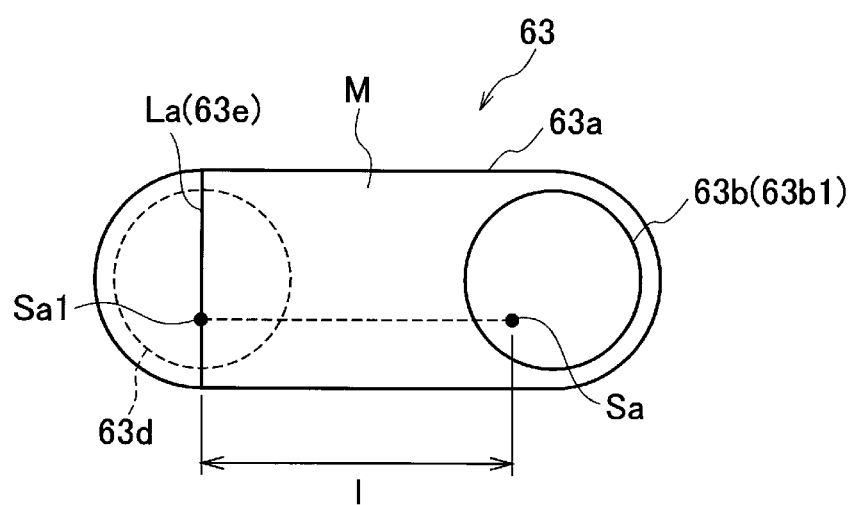
FIG. 7 is an explanatory diagram illustrating a slide-operation detection line set according to setting example (2) on an icon on the management screen displayed on a tablet terminal serving as an equipment management device according to the embodiment of the present invention.

Example (2) of Setting Slide-Operation Detection Area and Slide-Operation Detection Line Example (2) of setting a slide-operation detection area and a slide-operation detection line will be described with reference to FIG. 7. In setting example (2), all the area of the outer frame 63a of the corresponding air-conditioner icon 63 is set as a slide-operation detection area M. A slide-operation detection line 63e is set, when an administrator touches a specified position inside the in-operation mode display area 63b at step S3, based on the touched position. Specifically, when a position Sa inside the in-operation mode display area 63b is touched as illustrated in FIG. 7, point Sa1 is determined which is specified distance 1 away from the touched position Sa in the direction in parallel with the major axis of the outer frame 63a toward the pre-stop mode display area 63d. Then, straight line La that includes point Sa1 and is oriented in the minor axis direction within the outer frame 63a is set as a slide-operation detection line 63e. Specified distance 1 is set in advance such that the point Sa1 is set in the area within the outer frame 63a excluding the in-operation mode display area 63b.

Figure 8:
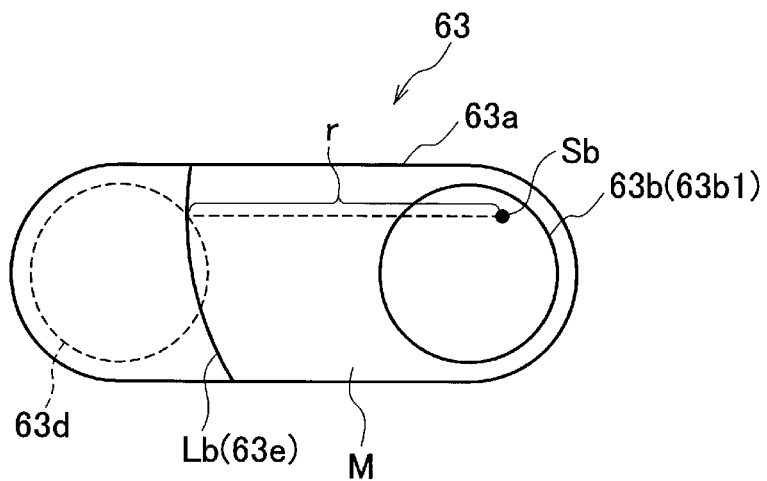
FIG. 8 is an explanatory diagram illustrating a slide-operation detection line set according to setting example (3) on an icon on the management screen displayed on a tablet terminal serving as an equipment management device according to the embodiment of the present invention.

Example (3) of Setting Slide-Operation Detection Area and Slide-Operation Detection Line Example (3) of setting a slide-operation detection area and a slide-operation detection line will be described with reference to FIG. 8. In setting example (3), all the area of the outer frame 63a of the corresponding air-conditioner icon 63 is set as a slide-operation detection area M. A slide-operation detection line 63e is set, when an administrator touches a specified position inside the in-operation mode display area 63b at step S3, based on the touched position. Specifically, when a position Sb inside the in-operation mode display area 63b is touched as illustrated in FIG. 8, curved line Lb that is part of the arc of the circle centered on the touched position Sb and having radius r, the part corresponding to the inside of the outer frame 63a, is set as a slide-operation detection line 63e. Radius r is set as illustrated in FIG. 8 such that the arc of the circle intersects the outer frame 63a at two points.

Although in the foregoing setting examples (1) to (3), all the area inside the outer frame 63a of the corresponding air-conditioner icon 63 is set as the slide-operation detection area M, part of the area inside the outer frame 63a, including the slide-operation detection line 63e may be set as a slide-operation detection area.

Figure 9:
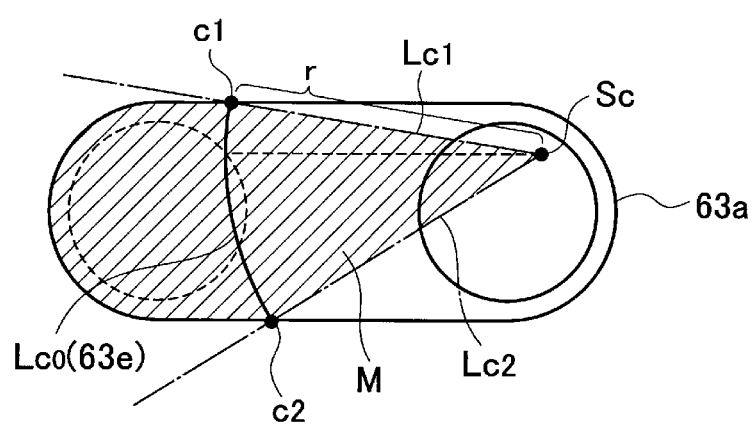
FIG. 9 is an explanatory diagram illustrating a slide-operation detection area and slide-operation detection line set according to setting example (4) on an icon on the management screen displayed on a tablet terminal serving as an equipment management device according to the embodiment of the present invention.

Example (4) of Setting Slide-Operation Detection Area and Slide-Operation Detection Line Example (4) of setting a slide-operation detection area and a slide-operation detection line will be described with reference to FIG. 9. In setting example (4), both the slide-operation detection area M and the slide-operation detection line 63e are set, when an administrator touches a specified position inside the in-operation mode display area 63b at step S3, based on the touched position. Specifically, when a position Sc on the upper side inside the in-operation mode display area 63b is touched as illustrated in FIG. 9, part Lc0 inside the outer frame 63a of the arc of the circle centered on the touched position Sc and having radius r is set as a slide-operation detection line 63e. Radius r is set such that the arc of the circle intersects the outer frame 63a at two points.

In FIG. 9, an arc of the circle centered on the touched position Sc and having radius r intersects the outer frame 63a at two points: point c1 and point c2, and part of this arc between point c1 and point c2 is set as a slide-operation detection line 63e. Then, the area (the hatched area in FIG. 9) M that includes the slide-operation detection line 63e and is surrounded by straight line Lc1 connecting the touched position Sc and point c1, straight line Lc2 connecting the touched position Sc and point c2, and the outer frame 63a is set as a slide-operation detection area. Since the slide-operation detection area M is set as described above, the detection range of the slide operation from the touched position Sc toward the pre-stop mode display area 63d is further limited, and thus it is possible to reduce erroneous determinations caused by inadvertent operations.

Figure 10:
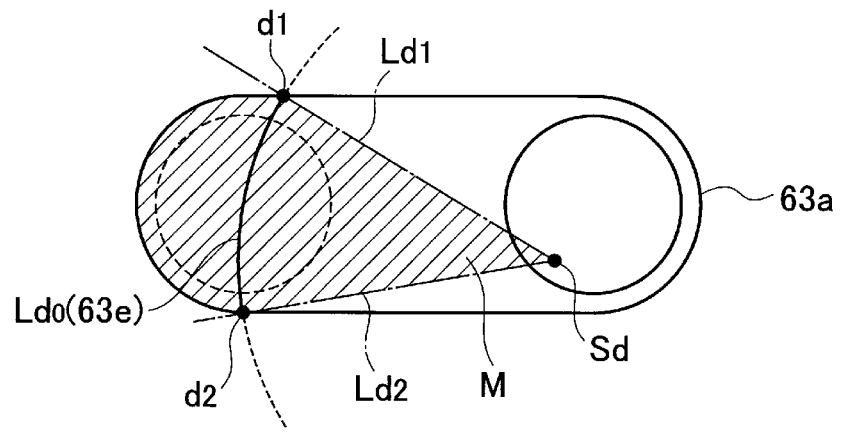
FIG. 10 is an explanatory diagram illustrating a slide-operation detection area and slide-operation detection line set according to setting example (4) on an icon on the management screen displayed on a tablet terminal serving as an equipment management device according to the embodiment of the present invention.

In this setting example (4), the same or a similar process is applied also in the case where an administrator touches a position on the lower side inside the in-operation mode display area 63b. As illustrated in FIG. 10, the area (the hatched area in FIG. 10) M that includes a slide-operation detection line 63e set based on a touched position Sd and is surrounded by straight line Ld1 connecting the touched position Sd and point d1, straight line Ld2 connecting the touched position Sd and point d2, and the outer frame 63a is set as a slide-operation detection area.

Note that theses slide-operation detection area M and slide-operation detection line 63e are set internally to determine an operation on the screen of the tablet terminal 50 and hence are not displayed on the actual management screen 60. Although these setting examples are examples of the operation determination from the on state to the off state, the same or a similar setting is applied also in the case of the operation determination from the off state to the on state. Specifically, in the case of the operation determination from the off state to the on state, the start point of the touched position is inside the pre-stop mode display area 63d, and the slide-operation detection line 63e is set on the in-operation mode display area 63b side on the right side in the figure.

When it is determined, using the slide-operation set area M and the slide-operation detection line 63e set according to one of the foregoing setting examples of (1) to (4) or a combination of these, that the path of the slide operation has passed on the corresponding slide-operation detection line 63e within the corresponding slide-operation detection area M ("YES" at S6), it is determined that the operation to stop the corresponding air conditioner 10-10 has been performed.

Figure 11:
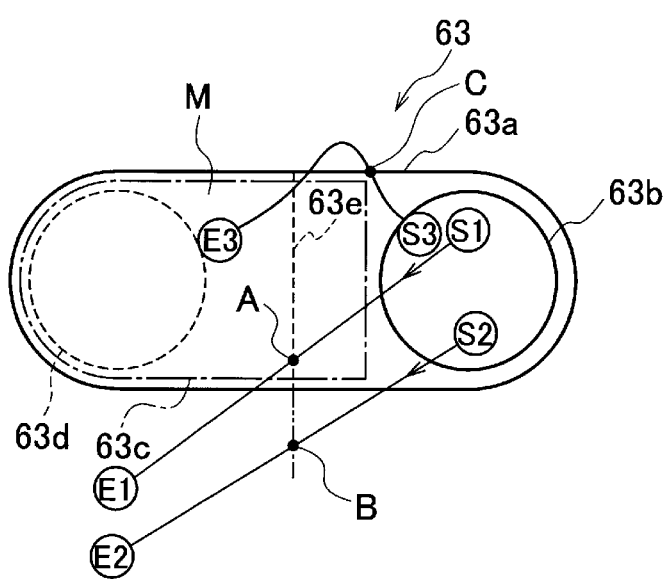
FIG. 11 is an explanatory diagram illustrating a slide operation performed on an icon on the management screen displayed on a tablet terminal serving as an equipment management device according to the embodiment of the present invention.

For example, when a slide operation is performed as illustrated in FIG. 11 using the slide-operation set area M and the slide-operation detection line 63e according to setting example (1), from a first operation start position S1 inside the in-operation mode display area 63b (the position at which the screen was touched at first) to a first operation end position E1 (the position at which the touch operation separated from the screen in the end), the path passes on the slide-operation detection line 63e at point A inside the outer frame 63a during the slide operation. Thus, the operation-item determination part 52 determines that the operation to stop the associated air conditioner 10-10 has been performed.

When a slide operation is performed from a second operation start position S2 inside the in-operation mode display area 63b to a second operation end position E2, the path reaches the extension line of the slide-operation detection line 63e (an imaginary part indicated with a dashed double-dotted line in FIG. 11) at point B outside the outer frame 63a, and hence this slide operation is not detected by the operation-item determination part 52. As above, even though the direction of a slide operation is the major axis direction (the left direction), a slide operation the path of which got out of the outer frame 63a without passing on the slide-operation detection line 63e is not detected.

In other words, for the operation of the air conditioner 10 from the on state to the off state, the operation-item determination part 52 determines that a slide operation is valid only in the case where in a continuous slide operation on the screen from the position within the in-operation mode display area 63b at which the screen was first touched, the slide operation passes on the slide-operation detection line 63e set inside the slide-operation detection area M. In other words, operations other than this are not determined to be valid.

When it is determined that an operation to stop the air conditioner 10-10 has been performed, the action-control-information generator 54 generates operation stop information, which is then transmitted to the controller 20 via the communication part 55. The controller 20, based on the received operation-stop-instruction information, switches the corresponding air conditioner 10-10 from the on state to the off state.

When it is determined that an operation to stop the air conditioner 10-10 has been performed, the display-information generator 53 changes the air-conditioner icon 63-10 inside the management screen 60 displayed on the display 512 from a color image to a monochrome image to indicate that the corresponding air conditioner 10-10 has been put into the off state. The management screen 60 after the change will be described with reference to FIG. 12. On the management screen 60 after the change, the outer frame 63b1 of the in-operation mode display area 63b inside this air-conditioner icon 63-10, the graphic 63b2 indicating the operational state of the air conditioner 10-10 (the graphic indicating the cooling mode at the time before the operation is stopped), and the information 63c1 indicating the set temperature in the set-temperature-information display area 63c (information "23.5°" at the time before the operation is stopped) are hidden, and the circular outer frame 63d1 of the pre-stop mode display area 63d is displayed. In addition, inside the circular outer frame 63d1 of the pre-stop mode display area 63d is displayed the graphic 63d2 indicating the cooling mode which is the operation mode of the air conditioner 10-10 at the time immediately before this operation. Although in FIG. 12, the circular outer frame 63d1 of the pre-stop mode display area 63d and the graphic 63d2 are depicted with dashed lines to indicate that these are displayed in monochrome, they are displayed with black solid lines on the actual screen.

In addition, when it is determined that the operation to stop the air conditioner 10-10 has been performed, the timer T inside the operation-item determination part 52 is reset (S7).

After a slide operation starts in the foregoing process, when it is determined that the path of the slide operation got out of the slide-operation detection area ("YES" at S5), the operation-item determination part 52 determines that this slide operation is not an operation to switch the air conditioner 10-10 from the on state to the off state, and the timer T is reset (S10).

For example, assume that the slide-operation detection area M and the slide-operation detection line 63e are set according to the foregoing setting example (1), and that as illustrated in FIG. 11, a slide operation begins with a touch operation to point S3, the path gets out of the air-conditioner icon 63 at point C on the outer frame 63a, after that, the path returns to the inside of the outer frame 63a, next, the path passes on the slide-operation detection line 63e, and then the finger separates from the screen at point E3 in the figure. In this case, when the path gets out of the outer frame 63a of the air-conditioner icon 63 at point C during the slide operation, it is determined that this is not an operation to switch the on/off of the air conditioner. This makes even lower the possibility that an inadvertent touch is determined to be a valid operation.

In addition, assume that after a slide operation starts, the path of the slide operation remains within the slide-operation detection area but that the slide operation ends by the finger separating from the screen without passing on the slide-operation detection line 63e ("NO" at S5, "NO" at S6, "YES" at S11). Also in this case, it is determined that this slide operation is not an operation to switch the air conditioner 10-10 from the on state to the off state, and the timer T is reset (S10).

In addition, assume that after a slide operation starts, the path of the slide operation remains within the slide-operation detection area, but that by the time when the count value of the timer T exceeds a threshold set in advance, the path does not pass on the slide-operation detection line 63e, and that it is determined that the execution time for the slide operation has exceeded a specified time ("NO" at S5, "NO" at S6, "NO" at S11, and "YES" at S12). Also in this case, it is determined that this slide operation is not an operation to switch the air conditioner 10-10 from the on state to the off state, and the timer T is reset (S10). If the count value of the timer T has not exceeded the threshold at step S12 ("NO" at S12), the process returns to step S5, and the process for determining whether this slide operation is an air-conditioner on/off-switch operation is repeated.

After the timer T is reset at step S7 or S10, during the time until the operation to finish management work is performed ("NO" at S8), the process of steps S3 to S12 is repeated every time a specified position inside the in-operation mode display area 63b of an air-conditioner icon 63 in the on state or inside the pre-stop mode display area 63d of an air-conditioner icon 63 in the off state is touched.

For example, in the case where an administrator performs a slide operation from the pre-stop mode display area 63d in the right direction on the air-conditioner icon 63-10 shown to be in the off state, this operation information is inputted through the operation-information input part 511. Then, based on the inputted operation information, when the operation-item determination part 52 detects that a slide operation was performed from the pre-stop mode display area 63d such that the slide operation passed on the slide-operation detection line 63e within the slide-operation detection area, it is determined that an operation to start the air conditioning operation of the corresponding air conditioner 10-10 has been performed ("YES" at S3, S4, "NO" at S5, "YES" at S6, S7).

Also for the operation of the air conditioner 10 from the off state to the on state as described above, the operation-item determination part 52 determines that a slide operation is valid in the case where in a continuous slide operation on the screen from the position within the pre-stop mode display area 63d at which the screen was first touched, the slide operation passes on the slide-operation detection line 63e within the slide-operation detection area, as in the operation from the on state to the off state.

When it is determined that an operation to start (turn on) the air conditioning operation of the air conditioner 10-10 has been performed, the action-control-information generator 54 generates operation start information, which is then transmitted to the controller 20 via the communication part 55. The controller 20, based on the received operation-start-instruction information, switches the corresponding air conditioner 10-10 from the off state to the on state. In this case, the air conditioner 10-10 resumes its operation in "the cooling mode with a set temperature of 23.5° C." which is the same operational state as the one immediately before the stop operation.

When it is determined that an operation to start the operation of the air conditioner 10-10 has been performed, the display-information generator 53 changes the air-conditioner icon 63-10 displayed on the display 512 from a monochrome image to a color image to indicate that the corresponding air conditioner 10-10 has been put into the on state. After the change, the outer frame 63d1 of the pre-stop mode display area 63d inside this the air-conditioner icon 63-10 and the graphic 63d2 inside it are hidden, and the in-operation mode display area 63b and the set-temperature-information display area 63c are displayed. At this time, the in-operation mode display area 63b shows the outer frame 63b1 of the in-operation mode display area 63b and the graphic 63b2 indicating the cooling mode which is the operation mode when the operation resumes, and the set-temperature-information display area 63c shows "23.5°" as the information 63c1 indicating the set temperature.

In addition, when it is determined that an operation to start the operation of the air conditioner 10-10 has been performed, the timer T inside the operation-item determination part 52 is reset (S7).

When an administrator performs an operation to stop the management work on the management screen 60, this operation information is inputted through the operation-information input part 511, and the operation-item determination part 52 determines the operation item. When the operation-item determination part 52 determines that an operation to stop the management work has been performed ("YES" at S8), the display-information generator 53 stops displaying the management screen 60 on the display 512 (S9).

Note that in the case where a touch operation starts on the displayed management screen 60 from a position outside the in-operation mode display area of an air-conditioner icon 63 in the on state or outside the pre-stop mode display area of an air-conditioner icon 63 in the off state ("NO" at S3), the operation-item determination part 52 determines that this operation is not an operation to switch the on/off state of the air conditioner.

The embodiment described above makes it possible to execute the on/off switching of a desired air conditioner that an administrator intends to operate with one simple operation on an icon on the management screen displayed on the touchscreen of a tablet terminal.

Figure 12:
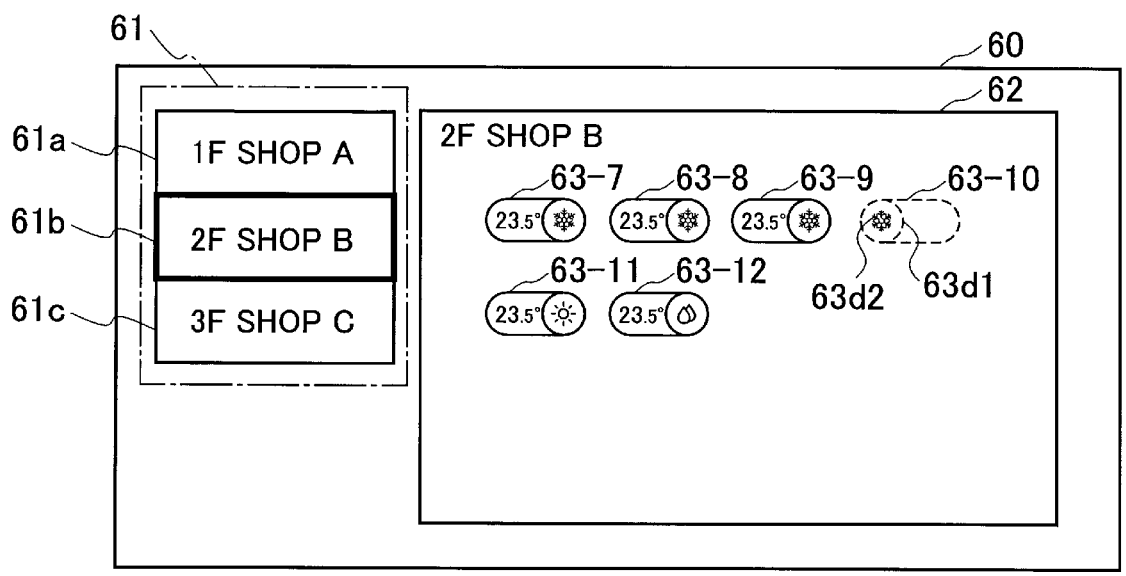
FIG. 12 is an example of a management screen after a change is made, displayed on a tablet terminal serving as an equipment management device according to the embodiment of the present invention.

As illustrated in FIGS. 4 and 12, the management screen needs to display information related to a large number of air conditioners 10 on its screen. Accordingly, each individual air-conditioner icon 63 needs to be small. However, the on/off switching of an air conditioner is an important operation, and hence, erroneous determinations have to be avoided as much as possible. In other words, touch operations on small icons have to be determined correctly without erroneous determinations, and the operations that an administrator intends need to be reliably applied to the system.

In the foregoing embodiment, the operation to switch the on/off state of an air conditioner by an administrator is determined to be valid in the case where the slide operation passes on the slide-operation detection line 63e within the slide-operation detection area in a continuous slide operation from a position at which the screen is first touched within the in-operation mode display area 63b of an air-conditioner icon 63 in the on state or within the pre-stop mode display area 63d of an air-conditioner icon 63 in the off state.

Since the determination by the operation-item determination part 52 uses, as described above, not only the start position and slide direction of the slide operation but a condition that "the slide operation passes on the slide-operation detection line 63e within the slide-operation detection area" which is the path in the middle of the slide operation, the possibility of erroneously determining that the operation from the off state to the on state or the operation from the on state to the off state has been performed is low even if one of the air-conditioner icons is inadvertently touched. This makes as small as possible the possibility of the occurrence of an erroneous operation to switch the on/off state of a corresponding air conditioner even if an administrator or the like inadvertently touches the management screen of the touchscreen.

Figure 13:
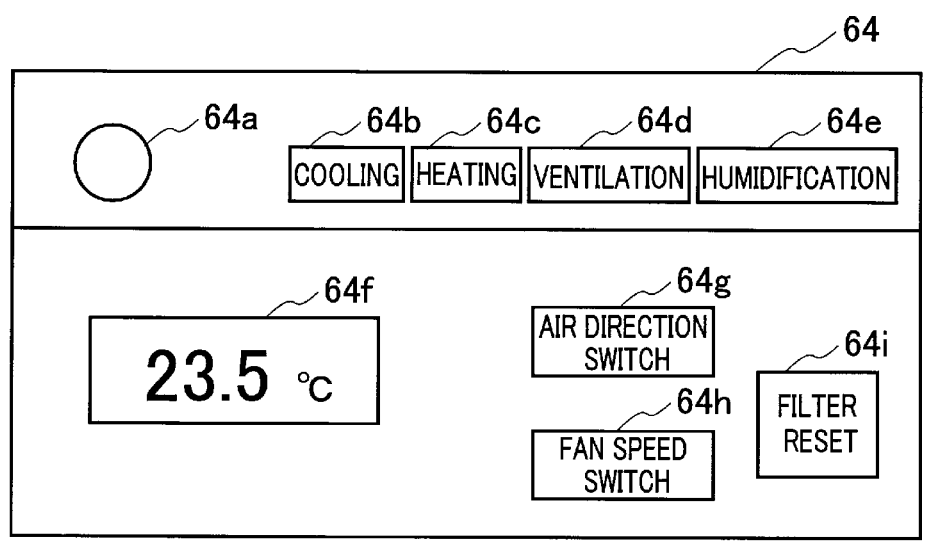
FIG. 13 is an example of a detailed management screen displayed on a tablet terminal serving as an equipment management device according to the embodiment of the present invention.

In the foregoing embodiment, when an administrator performs a specified operation on one of the operation buttons 61a to 61c for designating the management-work target area or one of the air-conditioner icons 63, the display-information generator 53 may display a detailed management screen 64 as illustrated in FIG. 13 on the display 512. Use of the detailed management screen 64 allows the administrator to control the operation of the corresponding air conditioner 10 further in detail. The detailed management screen 64 shows a power button 64a, cooling-mode button 64b, heating-mode button 64c, ventilation-mode button 64d, humidification-mode button 64e, temperature setting area 64f, air-direction switch button 64g, fan-speed switch button 64h, and filter reset button 64i.

When an administrator touches the power button 64a on the detailed management screen 64, the action-control-information generator 54 generates control information for switching the on/off state of the corresponding air conditioner 10. When the administrator touches the cooling-mode button 64b, heating-mode button 64c, ventilation-mode button 64d, or humidification-mode button 64e, the action-control-information generator 54 generates control information for switching the operation mode of the corresponding air conditioner 10 to the mode that the operated button indicates. When the administrator changes the display information in the temperature setting area 64f, the action-control-information generator 54 generates control information for changing the set temperature of the corresponding air conditioner 10. When the administrator touches the air-direction switch button 64g, the action-control-information generator 54 generates control information for changing the air direction of the corresponding air conditioner 10. When the administrator touches the fan-speed switch button 64h, the action-control-information generator 54 generates control information for changing the fan speed of the corresponding air conditioner 10. When the administrator touches the filter reset button 64i after the filter of the corresponding air conditioner 10 is replaced, the action-control-information generator 54 generates control information for resetting the value indicating the time until the next filter replacement. Generated control information is transmitted to the controller 20 via the communication part 55, and the controller 20 control the operation of the corresponding air conditioner 10.

Note that the foregoing embodiment is described for a case where the ends of the slide-operation detection line 63e used for the operation-item determination part 52 to determine whether a slide operation on the touchscreen 51 is valid are located on the outer frame 63a. However, the ends of the slide-operation detection line 63e do not have to be exactly on the outer frame 63a but may be at positions a little different from the outer frame 63a as long as the positions are in the vicinities of the outer frame 63a and can be considered to be substantially on the outer frame 63a. In other words, when a slide operation was performed from the in-operation mode display area 63b or the pre-stop mode display area 63d such that the slide operation passed the slide-operation detection line 63e substantially within the outer frame 63a, the action-control-information generator 54 switches the on/off state of the air conditioner 10.

The foregoing embodiment has been described for a case where one condition, as a factor for determining that an on/off switching operation for an air conditioner is valid, is that a touch operation is performed, at the beginning of the touch operation, within the in-operation mode display area 63b of an air-conditioner icon 63 in the on state or within a pre-stop mode display area 63d of an air-conditioner icon 63 in the off state, on the displayed management screen 60. Also for the position of the touch operation at the beginning of the touch operation, the valid condition may include not only the case where the position of the touch operation is completely inside the in-operation mode display area 63*b* or the pre-stop mode display area 63*d* but also the case where the position of the touch operation is around the outer edge of the area.

Although the embodiment of the present invention has been described as above, this embodiment has been presented as an example and hence is not intended to limit the scope of the invention. This novel embodiment can be implemented in other various forms, and hence various omissions, replacements, and modifications can be made without departing from the gist of the invention. This embodiment and modifications thereof are included in the scope and gist of the invention and also included in the scope of the invention stated in the claims and equivalents thereof.

The invention claimed is:

1. An equipment management device comprising:
   a touchscreen configured to display information on a management screen and configured to input information on an operation performed on the management screen through the touchscreen; and
   a processor in communication with the touchscreen and configured to perform processing comprising:
      display-information generator processing configured to generate the display information on the management screen in which a plurality of icons are arranged, each of the plurality of icons being associated with at least one of multiple pieces of equipment in a building under management and having a laterally elongated outer frame and a first area that is set inside the outer frame at one end in a major axis direction of the outer frame, wherein when an associated equipment of the multiple pieces of equipment is on, the display-information generator displays an operation mode of the associated equipment in the first area and displays a setting information of the associated equipment in a second area that is located inside the outer frame but outside the first area, and
      action-control-information generator processing configured to generate action control information that switches the on/off state of a corresponding piece of equipment in response to the processor detecting a slide operation performed on one of the plurality of icons on the management screen displayed on the touchscreen.

2. The equipment management device according to claim 1, wherein: when the associated equipment is off, the display-information generator processing displays the operation mode of the associated equipment at the time immediately before the associated equipment stopped operating in a third area set inside the outer frame at the other end in the major axis direction of the outer frame, which is opposite to the first area.

3. The equipment management device according to claim 2, wherein: in response to the processor detecting that the slide operation has been performed on the management screen displayed on the touchscreen such that the slide operation starts in the first area and passes the first slide-operation detection line set within the outer frame excluding the first area, the action-control-information generator generates action control information that switches the power of the corresponding piece of equipment from an on state to an off state, and in response to the processor detecting that the slide operation has been performed such that the slide operation starts in the third area and passes the first slide-operation detection line within the outer frame, the action-control-information generator generates action control information for switching the power of the corresponding piece of equipment from the off state to the on state.

4. The equipment management device according to claim 2, wherein: in response to the processor detecting that the slide operation has been performed on the management screen displayed on the touchscreen such that the slide operation starts in the first area and passes the first slide-operation detection line set within the outer frame excluding the first area, the action-control-information generator generates action control information that switches the power of the corresponding piece of equipment from an on state to an off state, and in response to the processor detecting that the slide operation has been performed such that the slide operation starts in the third area and passes a second slide-operation detection line set at a position different from the position of the first slide-operation detection line, within the outer frame, the action-control-information generator generates action control information for switching the power of the corresponding piece of equipment from the off state to the on state.

5. The equipment management device according to claim 4, wherein each of the first slide-operation detection line and the second slide-operation detection line is either: a straight line including a point away from the start position of the corresponding slide operation by a specified distance within the outer frame in the major axis direction of the outer frame and set within the outer frame to be oriented in a minor axis direction of the outer frame, or a curved line being part of an arc of a circle centered on the start position of the corresponding slide operation, the part corresponding to the inside of the outer frame.

6. The equipment management device according to claim 5, wherein: in response to the processor detecting that the slide operation has been performed on the management screen displayed on the touchscreen such that the slide operation starts in the first area, that the first slide-operation detection line is set based on the start position of the slide operation, and that the slide operation passes the first slide-operation detection line within an area surrounded by straight lines and the outer frame, the straight lines being drawn from the intersection points of the first slide-operation detection line and the outer frame to the start position of the slide operation, the action-control-information generator generates action control information that switches the power of the corresponding piece of equipment from the on state to the off state, and in response to the processor detecting that the slide operation has been performed on the management screen displayed on the touchscreen such that the slide operation starts in the third area, that a second slide-operation detection line is set based on the start position of the slide operation, and that the slide operation passes the second slide-operation detection line within an area surrounded by straight lines and the outer frame, the straight lines being drawn from the intersection points of the first slide-operation detection line and the outer frame to the start position of the slide operation, the action-control-information generator generates action control information that switches the power of the corresponding piece of equipment from the off state to the on state.

7. The equipment management device according to claim 1, wherein in response to an operation to designate a specified piece of equipment being performed on the touchscreen, the display-information generator generates a detailed management screen for controlling multiple operations of the corresponding piece of equipment, and in response to the processor detecting that an operation to control one of the operations of the corresponding piece of equipment has been performed on the detailed management screen, the action-control-information generator generates action control information for the corresponding operation.

8. The equipment management device according to claim 1, wherein the piece of equipment is an air conditioner, and the setting information is a set temperature.

9. An equipment-management-screen generation method for an equipment management device for managing multiple pieces of equipment in a building under management, comprising: generating, by a processor, display information on a management screen in which a plurality of icons are arranged, each of the plurality of icons being associated with at least one of the multiple pieces of equipment and having a laterally elongated outer frame and a first area that is set inside the outer frame at one end in a major axis direction of the outer frame wherein when an associated equipment is on, the generating displays an operation mode of the associated equipment in the first area and displays a setting information of the associated equipment in a second area that is located inside the outer frame but outside the first area; displaying, by the processor on a touchscreen, the display information on the management screen; and in response to the processor detecting that a slide operation has been performed on one of the plurality of icons on the management screen displayed on the touchscreen, generating, by the processor, action control information that switches the on/off state of a corresponding piece of equipment.

* * * * *